United States Patent Office 2,912,420
Patented Nov. 10, 1959

2,912,420

PROCESS FOR POLYMERIZING OLEFINS

Charles L. Thomas, Swarthmore, Pa., assignor to Sun Oil Company, Philadelphia, Pa., a corporation of New Jersey No Drawing. Application April 17, 1957
Serial No. 653,298

8 Claims. (Cl. 260—93.7)

This invention relates to a new process for the preparation of relatively high molecular weight polymers, and more particularly relates to a process for the preparation of solid polymers of alpha-olefins.

Alpha-olefins such as propylene have heretofore been polymerized to high molecular weight solid polymers. A catalyst which is especially effective for the polymerization of alpha-olefins to such relatively high molecular weight solid polymers is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing alpha-olefins to solid polymers. If desired, a lower halide such as titanium trichloride can be preformed, dispersed in an inert liquid, and an activator such as an aluminum trialkyl added. This solid phase acts as a catalyst for polymerizing alpha-olefins to solid polymers. In performing the polymerization step, an alpha-olefin is contacted with the solid catalyst, such as by passing the olefin through a suspension of the finely divided solid in the inert liquid reaction medium, and is thereby polymerized to solid polymers. Other materials can be substituted for the titanium trichloride and/or aluminum triethyl, as hereinafter described. Anhydrous and oxygen-free conditions are used throughout the process, since the catalyst is deactivated by contact with water or oxygen.

After the polymerization reaction is complete or has proceeded to a desired extent, a catalyst deactivating material such as water or an alcohol is added to the reaction mixture and the mixture is agitated preferably by means which comminute the polymer so that catalyst particles embedded in the polymer are exposed to the deactivant. Thereafter, in order to remove the inorganic catalyst or the inorganic particles from catalyst deactivation, the reaction mixture is contacted with a strong inorganic acid such as an aqueous or alcoholic solution of nitric acid. This contacting is performed at an elevated temperature using vigorous agitation means which may also comminute the polymer so that catalyst particles embedded therein are exposed to the action of the solution. In order to remove even a substantial part of the inorganic particles, the contacting at an elevated temperature is continued for an extended period of time, usually at least several hours. The solid polymer is then separated from the acid solution and is washed and dried. The described means for removing catalyst particles is unsatisfactory in that contacting must be continued for a long time, the inorganic acid especially at the elevated temperatures used is corrosive, an appreciable amount of inorganic material normally remains in the polymer, and the appearance of the final polymer product is adversely affected by contact with the strong acid.

An object of the present invention is to provide a process for the preparation of relatively high molecular weight solid polymers of alpha-olefins. Another object is to provide a process for the preparation of solid polymers of alpha-olefins which are substantially free from inorganic particles. A specific object is to provide a process for polymerizing normally gaseous olefins in which catalyst particles are rapidly and economically removed from the polymer product without the necessity of using corrosive acids. Other objects and their achievement in accordance with the present invention will be apparent hereinafter.

It has now been found that by contacting a polymerization reaction mixture consisting essentially of solid polymers of an alpha-olefin, solid catalyst particles or solid particles from catalyst deactivation, and an inert liquid reaction medium with an aqueous solution of oxalic acid, and subsequently separating the aqueous solution, there is obtained a white polymer product having a substantially reduced content of inorganic components.

Although the process of the invention is applicable to alpha-olefins generally, as hereinafter defined, for convenience the present process is described largely in terms of polymerizing propylene to form solid polypropylene.

In an embodiment of the process of the invention, propylene is contacted with a dispersion of a solid catalytic material mainatined in an inert liquid reaction medium. After the polymerization reaction, a catalyst deactivating material is added to the reaction mixture. Water or an alcohol such as methanol, ethanol, propanol, isopropanol, the butyl alcohols and the like, can be used. After the catalyst deactivation, the excess catalyst deactivating liquid is removed such as by draining and an aqueous solution of oxalic acid added. It is only necessary to contact such aqueous solution with the polymer for a relatively short period of time, 0.5 hour generally being sufficient. The polymer is then washed with water and dried. In another embodiment of the process, as hereinafter described, it is advantageous to combine the catalyst deactivating step with the catalyst removal step, e.g., by using an aqueous solution of oxalic acid to both deactivate and remove the catalyst.

The polypropylene product obtained as above described has a melting point of from 160° C. to 170° C., a tensile strength of from 4,000 to 6,000 p.s.i. (pounds per square inch), and a molecular weight of from 100,000 to 250,000. The polymer may be substantially crystalline or substantially amorphous in nature. Usually a mixture of crystalline and amorphous polymer is obtained. If desired, amorphous polymer can be separated from the crystalline polymer by contacting a mixture thereof with a hydrocarbon solvent such as isooctane or n-heptane at an elevated temperature. The amorphous polymer is substantially soluble under these conditions whereas the crystalline polymer is substantially insoluble. The polymer prepared according to the present invention can be either crystalline or mixtures of crystalline with amorphous polymer in which the mixture contains at least 25% by weight, and preferably at least 50% by weight, of the crystalline polymer. A polymer which consists essentially of crystalline polypropylene is an especially desirable product because of its superior properties.

In performing the polymerization step of the present process, a catalyst which is a lower halide of titanium is used as above described. Titanium trichloride, titanium dichloride, and mixtures thereof give good results. The titanium of the titanium halide must be in a valence other than its highest valence state. The reduction of a metal compound such as titanium tetrachloride can be accomplished by any convenient means. As above described, an aluminum trialkyl can be used as the reducing agent, or other reducing means such as by contacting the metal compound with a dispersion of an alkali metal in an inert solvent can be used. It is necessary, however, that an activator such as an aluminum trialkyl be present as a component of the catalyst, and it is convenient in many instances to employ such a compound as both the reducing agent and the activator. However, the use of a prereduced compound, such as $TiCl_3$ or $TiCl_2$, together with an activator, gives excellent results. Materials which can be used as the activator are the aluminum trialkyls. Aluminum triethyl, aluminum triisopropyl and aluminum triisobutyl give good results in the process and are preferred, but aluminum alkyls having up to about 12 carbon atoms in the alkyl groups can be used with good results.

The quantities of catalytic components can be varied and good results obtained. A mole ratio of the titanium compound to activator of from 1:10 to 10:1 gives good results when the titanium compound is prereduced or is reduced by the activator. The total quantities used are preferably such that a light slurry of the solid phase in the inert, liquid reaction medium which can be easily agitated is obtained. Generally from 1 part of catalyst particles to from 30 to 1,000 or more parts of the reaction medium gives good results.

As above described, the catalyst is a finely divided solid maintained as a slurry, or a dispersion, in an inert liquid reaction medium. Saturated hydrocarbons such as the hexanes, heptanes, octanes, decanes, cyclopentanes, cyclohexanes, mixtures thereof and the like which are liquid under the conditions of reaction are preferred materials to use as the reaction medium. Propylene is introduced into the catalyst slurry such as by bubbling propylene in gas phase into the slurry. If desired, the propylene can be dissolved in a hydrocarbon which is preferably the same as the reaction medium, and the resulting solution contacted with the catalyst slurry. The polymerization is performed under polymerizing conditions including a temperature within the range of from about 0° C. to 250° C. and a pressure of from atmospheric to about 5,000 p.s.i.g. (pounds per square inch gauge) or more, it being necessary that the reaction medium be maintained in the liquid phase.

After the polymerization step, the catalyst deactivating material is added to the reaction mixture. If a relatively large quantity of inert reaction medium was used in the polymerizing step, it is advantageously separated from the polymer product such as by draining prior to introducing the catalyst deactivant. Water or a relatively low molecular weight alcohol such as methanol, ethanol, propanol, or isopropanol is a preferred catalyst deactivant. Contacting the polymer with the catalyst deactivant is preferably performed with agitation means which chop or comminute the polymer so that catalyst particles coated by or embedded in the polymer are exposed to the action of the deactivant. The liquid deactivant is then preferably removed from the polymer such as by draining or filtering, and the separated polymer contacted with an aqueous solution of oxalic acid. The temperature of this contacting is advantageously in the range of from about 10° C. to 100° C. Preferably a solution which is substantially saturated at the temperature of washing is used, but concentrations as low as 1% by weight give good results within the defined temperature range. The total quantity of the solution used to contact the polymer can be varied substantially. A quantity sufficient to insure good mixing should be used. Generally from about 10 to 300 parts of solution per part of polymer is used. The concentration of oxalic acid in the solution, and the quantity of solution used, should be sufficient to supply at least 1.5 moles of oxalic acid for each mole of titanium present, and preferably a higher mole ratio, say from about 2 to 50 is used. Only a relatively short contacting time is required, say from about 0.1 to 1 hour, but longer times can be used without deleterious results. Mild agitation means are preferably employed during this contacting.

In an embodiment of the invention, an aqueous solution of oxalic acid is used as both the catalyst deactivant and to remove the catalyst or catalyst residues from the polymer. In this embodiment, the aqueous oxalic acid solution is added directly to the reaction mixture, preferably after the removal of excess inert liquid reaction medium, if any, from the polymer. In this embodiment, the admixing of the acid solution with the polymer should be by means which chop or comminute the polymer, thereby exposing catalyst particles embedded therein or coated thereby. Preferably the contacting is performed at an elevated temperature which is advantageously from about 50° C. to 100° C., since use of an elevated temperature appears to accelerate the simultaneous deactivation and removal of inorganic contaminants from the polymer.

In another embodiment of the invention, the oxalic acid can be dissolved in a mixture of water and a low molecular weight alcohol, such as methanol, ethanol, propanol, or isopropanol. Such a mixture advantageously contains 0.5% to 30% by weight alcohol. It appears that the presence of alcohol increases the rate of catalyst removal by the oxalic acid solution. If desired, the polymer can be wet with the alcohol prior to adding the aqueous solution of the oxalic acid.

In a further embodiment of the invention, a small amount of nitric acid is added to the aqueous oxalic acid solution. Not more than about 5% by weight, and preferably from about 0.05% to about 2% by weight of the nitric acid is used. In this embodiment, the temperature of contacting the polymer with the acid solution should be relatively low, from about 10° C. to 50° C. being suitable, so that difficulties with corrosion are not experienced. The presence of nitric acid appears to accelerate the removal of inorganic particles from the polymer so that the time of contact otherwise required is substantially lessened.

In the process of the invention, the titanium content of the polymer is substantially decreased. While the exact nature of the titanium-containing materials admixed with the polymer is not known, they are for convenience herein referred to as "inorganic components" or "inorganic titanium components," it being understood that it is the presence of titanium that determines whether a material is included within such terms.

The following examples illustrate the process of the invention in which "parts" refers to parts by weight unless otherwise indicated:

*Example 1*

A solid polypropylene polymer product was prepared by incorporating 4.95 parts of titanium trichloride and a quantity of aluminum triethyl sufficient to give a mole ratio thereof to titanium trichloride of substantially 1 in 2736 parts of n-heptane. The temperature of the resulting slurry was adjusted to 85° C. and propylene was thereupon introduced to give a pressure of 200 p.s.i.g. The reaction was continued for 100 minutes during which time the pressure was maintained at substantially 200 p.s.i.g. by periodic addition of propylene. Isopropanol was then added to the reaction mixture to deactivate the catalyst. The solid polypropylene product was separated and divided into several portions.

A portion, about 20 parts, of the polypropylene containing deactivated catalyst are contacted, at ambient temperature, with 300 parts of water saturated with oxalic acid at room temperature for ¼ hour. The product is then drained, washed with water, and dried. When the resulting polymer is molded at 10,000 p.s.i.g. and 232° C. to form a polymer article having a thickness of about ⅛ inch, the article is transparent and a very pale yellow color.

To a similar portion of the polypropylene product, prepared as above described, are added about 200 parts of a 10% solution of nitric acid in isopropanol. The mixture is heated to reflux temperature for 1½ hours, and the product then washed with water and dried. The resulting product, molded substantially as above described, but at 232° C. at 5000 p.s.i.g., gives an opaque product having a distinct yellowish-brown color, even though the molding conditions were relatively mild.

To another similar portion of the polypropylene product, prepared as above described, are added about 200 parts of a 10% solution of oxalic acid in water. The resulting admixture is stirred at about 60° C. for about 15 minutes. The product is then drained, washed with water and dried. A transparent, very pale yellow product having excellent molding characteristics is obtained.

*Example 2*

Polypropylene is prepared in Example 1, except that the catalyst is not deactivated as there described. Excess n-heptane is drained from the reaction mixture and to the resulting solid polypropylene containing active catalyst particles is added an aqueous solution of oxalic acid (5% by weight) and of nitric acid (0.1% by weight), about 100 parts of the solution per part of polymer being used. Before the contacting, the temperature of the solution is adjusted to about 15° C. With the temperature maintained at substantially 15° C., the slurry of polypropylene-catalyst in the aqueous acid solution is vigorously agitated for 15 minutes. The solution is then drained, and the polymer product washed and dried. The resulting product is white granular solid of excellent molding characteristics.

In the foregoing examples, which were performed in accordance with the process of the invention, no difficulties were experienced with corrosion.

Although the invention is largely described in terms of polymers of propylene, the invention is applicable to solid polymers of other olefins, such as ethylene, butene-1, isobutylene, 3-methylbutene-1, 3-methylpentene-1, butadiene, and other alpha-olefins, i.e., olefins having a terminal olefinic bond, having not more than 8 carbon atoms, and mixtures of such olefins. The alpha-olefins can be from any source, such as from petroleum refinery streams, the dehydrogenation of hydrocarbons, the dehydration of alcohols, or the like. The presence of saturated hydrocarbons in the feed olefins is not deleterious, and such hydrocarbons serve as inert diluent.

The products of the invention are especially useful in applications where appearance is important, such as in films for wrapping purposes, especially for wrapping food products, as containers for liquids, and the like. Such articles can be prepared by molding, extrusion, or other fabrication processes.

The invention claimed is:

1. Process for the preparation of a solid polypropylene product which comprises contacting solid polypropylene having inorganic titanium components with an aqueous solution of oxalic acid, and separating the polymer from the aqueous oxalic acid solution.

2. Process for the preparation of a solid polypropylene product which comprises contacting polypropylene having a molecular weight of from about 100,000 to 250,000 containing inorganic titanium components with an aqueous solution of oxalic acid, and separating white, solid polypropylene from the aqueous solution.

3. Process according to claim 2 wherein the solution of oxalic acid contains at least 1% by weight of oxalic acid.

4. Process for the preparation of a solid polypropylene product which comprises contacting solid polypropylene containing inorganic titanium components with a substantially saturated aqueous solution of oxalic acid for ¼ hour, and separating solid polypropylene having a reduced content of inorganic components from the solution.

5. Process according to claim 4 wherein from 10 to 300 parts of the aqueous oxalic acid solution per part of polymer is used.

6. Process according to claim 4 wherein said contacting is performed at a temperature within the range of from about 10° C. to 100° C.

7. Process for the preparation of a solid polypropylene product which comprises contacting solid polypropylene containing inorganic titanium components with an aqueous solution of oxalic acid containing from about 0.05% to about 5% by weight of nitric acid for at least ¼ hour, and separating solid polypropylene having a reduced content of inorganic components from the solution.

8. Process for the preparation of solid polypropylene which comprises contacting, under polymerizing conditions, propylene with a subhalide of titanium and an aluminum alkyl activator therefor maintained as a slurry in an inert, liquid hydrocarbon, whereby solid polypropylene is produced, contacting the solid polypropylene with an aqueous solution of oxalic acid, and separating solid polypropylene having a reduced content of inorganic titanium components from said aqueous solution.

References Cited in the file of this patent

UNITED STATES PATENTS 2,699,457   Ziegler et al. _____ Jan. 11, 1955

FOREIGN PATENTS 533,362   Belgium _____ May 16, 1955